US009055168B2

(12) United States Patent
Tabushi

(10) Patent No.: US 9,055,168 B2
(45) Date of Patent: Jun. 9, 2015

(54) COMMUNICATION APPARATUS AND STORAGE MEDIUM STORING INSTRUCTIONS EXECUTABLE ON MOBILE TERMINAL

(71) Applicant: BROTHER KOGYO KABUSHIKI KAISHA, Nagoya-shi, Aichi-ken (JP)

(72) Inventor: Chika Tabushi, Toyoake (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/034,517

(22) Filed: Sep. 23, 2013

(65) Prior Publication Data

US 2014/0086398 A1 Mar. 27, 2014

(30) Foreign Application Priority Data

Sep. 24, 2012 (JP) .................................. 2012-209881

(51) Int. Cl.
*H04N 1/00* (2006.01)

(52) U.S. Cl.
CPC ........... *H04N 1/00106* (2013.01); *H04N 1/001* (2013.01); *H04N 2201/0093* (2013.01);
(Continued)

(58) Field of Classification Search
CPC . H04N 1/0022; H04N 1/001; H04N 1/00106; H04N 1/00307; H04N 2201/0093; H04N 2201/006; H04N 2201/0041; H04N 2201/0055
USPC ............. 379/100.08, 100.01, 100.02, 100.09, 379/100.12, 100.13; 358/1.15, 400, 440, 358/442
See application file for complete search history.

(56) References Cited

U.S. PATENT DOCUMENTS

| 5,887,136 A | 3/1999 | Yasuda et al. |
| 2006/0089125 A1 | 4/2006 | Frank |

(Continued)

FOREIGN PATENT DOCUMENTS

| JP | H07-015541 A | 1/1995 |
| JP | 2006-163791 A | 6/2006 |

(Continued)

OTHER PUBLICATIONS

Non-Final Office Action (U.S. Appl. No. 14/035,881) mailed Jan. 2, 2015 (17 pages).

*Primary Examiner* — Melur Ramakrishnaiah
(74) *Attorney, Agent, or Firm* — Merchant & Gould PC

(57) ABSTRACT

A first communicating section communicates with a mobile terminal through first non-contact communication protocol having a first communication range. A mobile terminal has a telephone function via a telephone network. A second communicating section communicates with the mobile terminal through second non-contact communication protocol having a second communication range greater than the first communication range. A public-line communicating section transmits data via the telephone network. When executed by a processor, the instructions cause the processor to perform: acquiring destination information from the mobile terminal via the first communicating section, the destination information being associated with a counterpart apparatus connected to the telephone network; acquiring subject data from the mobile terminal via the second communicating section, the subject data being a subject of transmission to the destination information; and controlling the public-line communicating section to transmit transmission data corresponding to the subject data to the counterpart apparatus at the destination information.

14 Claims, 7 Drawing Sheets

(52) U.S. Cl.
CPC ........ *H04N2201/006* (2013.01); *H04N 1/0022* (2013.01); *H04N 1/00307* (2013.01); *H04N 2201/0041* (2013.01); *H04N 2201/0055* (2013.01)

(56) References Cited

U.S. PATENT DOCUMENTS

| | | | |
|---|---|---|---|
| 2006/0105745 | A1 | 5/2006 | Frank |
| 2007/0123310 | A1 | 5/2007 | Natsuno et al. |
| 2009/0066998 | A1* | 3/2009 | Kato .......................... 358/1.15 |
| 2010/0214604 | A1 | 8/2010 | Hosono et al. |
| 2011/0197163 | A1 | 8/2011 | Jegal et al. |
| 2011/0256907 | A1 | 10/2011 | Lee et al. |
| 2011/0292445 | A1* | 12/2011 | Kato .......................... 358/1.15 |
| 2011/0300883 | A1 | 12/2011 | Kwon |

FOREIGN PATENT DOCUMENTS

| | | |
|---|---|---|
| JP | 2007-312142 A | 11/2007 |
| JP | 2009-147896 A | 7/2009 |
| JP | 2010-199642 A | 9/2010 |
| JP | 2011-101125 A | 5/2011 |

* cited by examiner

| No. | TELEPHONE NUMBER | FAX NUMBER |
|---|---|---|
| 1 | 052-777-8888 | 052-777-8889 |
| 2 | 052-666-7777 | 052-666-7778 |
| 3 | 053-555-6666 | 053-555-6667 |
| 4 | 053-444-5555 | 053-444-5556 |

<DIRECTION STATEMENT>
■ WIRELESS LAN SETTING
ch: 1
SSID: aaabbb
WEP KEY: 12345
IP Address: 192.168.1.4
■ JOB
STATE: DURING TELEPHONE CALL
INSTRUCTION: DATA TRANSMISSION
■ DESTINATION INFORMATION
TELEPHONE NUMBER A
TELEPHONE NUMBER B
E-MAIL ADDRESS C

FIG. 8

| No. | TELEPHONE NUMBER A | TELEPHONE NUMBER B | E-MAIL ADDRESS C | ADDRESS TYPE | ADDRESS |
|---|---|---|---|---|---|
| EXAMPLE 1 | 052-777-8888 | DOES NOT MATTER | DOES NOT MATTER | FAX | 052-777-8889 |
| EXAMPLE 2 | 080-222-0000 | DOES NOT MATTER | aaa@bbbb.com | MAIL | aaa@bbbb.com |
| EXAMPLE 3 | 070-111-3333 | DOES NOT MATTER | NOT INCLUDED | NON-TRANSMITTABLE | — |
| EXAMPLE 4 | 054-333-4444 | 054-333-4445 | DOES NOT MATTER | FAX | 054-333-4445 |
| EXAMPLE 5 | 055-333-5555 | NOT INCLUDED | DOES NOT MATTER | FAX | 055-333-5555 |
| EXAMPLE 6 | 055-333-3333 | 090-222-3333 | DOES NOT MATTER | FAX | 055-333-3333 |

STORE IN RAM (26)

COMMUNICATION APPARATUS AND STORAGE MEDIUM STORING INSTRUCTIONS EXECUTABLE ON MOBILE TERMINAL

CROSS REFERENCE TO RELATED APPLICATIONS

This application claims priority from Japanese Patent Application No. 2012-209881 filed Sep. 24, 2012. The entire content of the priority application is incorporated herein by reference.

TECHNICAL FIELD

The invention relates to a communication apparatus and a storage medium storing instructions executable on a mobile terminal that communicates with the communication apparatus through non-contact communication.

BACKGROUND

A conventional communication apparatus having a facsimile function can transmit facsimile data corresponding to a read original document to a desired counterpart apparatus through a telephone network. The counterpart apparatus prints, saves and/or forwards received facsimile data. In this way, information included in the original document can be delivered to a user of the counterpart apparatus. A conventional mobile terminal having a telephone function through a telephone network can perform non-contact communication with another apparatus in a plurality of communication methods, as well as a telephone function through the telephone network.

SUMMARY

The inventor studied technology of allowing a mobile terminal and a communication apparatus having a facsimile function to cooperate, by using non-contact communications with a plurality of communication methods. Specifically, the inventor studied technology of transmitting predetermined data (information) acquired from the mobile terminal to a counterpart apparatus connected to a telephone network.

In view of the foregoing, the invention provides a communication apparatus. The communication apparatus includes a first communicating section, a second communicating section, a public-line communicating section, a processor, and a memory storing instructions. The first communicating section is configured to communicate with a mobile terminal in compliance with first non-contact communication protocol when the mobile terminal is located within a first communication range. The mobile terminal has a telephone function via a telephone network. The second communicating section is configured to communicate with the mobile terminal in compliance with second non-contact communication protocol when the mobile terminal is located within a second communication range. The second communication range is greater than the first communication range. The public-line communicating section is configured to transmit data via the telephone network. When executed by the processor, the instructions cause the processor to perform: acquiring destination information from the mobile terminal via the first communicating section, the destination information being associated with a counterpart apparatus connected to the telephone network; acquiring subject data from the mobile terminal via the second communicating section, the subject data being a subject of transmission to the destination information; and controlling the public-line communicating section to transmit transmission data corresponding to the subject data to the counterpart apparatus at the destination information.

The invention also provides a storage medium storing a set of instructions executable by a processor of a mobile terminal having a telephone function through a telephone network. The mobile terminal includes a fifth communicating section configured to communicate with a communication apparatus in compliance with first non-contact communication protocol when the mobile terminal is located within a first communication range, the communication apparatus having a facsimile function through the telephone network; and a sixth communicating section configured to communicate with the communication apparatus in compliance with second non-contact communication protocol when the mobile terminal is located within a second communication range, the second communication range being greater than the first communication range. When executed by the processor of the mobile terminal, the set of instructions causes the processor to perform: controlling the fifth communicating section to transmit, to the communication apparatus, destination information associated with a counterpart apparatus connected to the telephone network; and controlling the sixth communicating section to transmit subject data to the communication apparatus, the subject data being used for generating transmission data transmitted from the communication apparatus to the counterpart apparatus at the destination information.

BRIEF DESCRIPTION OF THE DRAWINGS

Embodiments in accordance with the invention will be described in detail with reference to the following figures wherein:

FIG. 8 is an explanatory view showing determination results obtained in the address determining process.

DETAILED DESCRIPTION

<Communication System>

Figure 1:
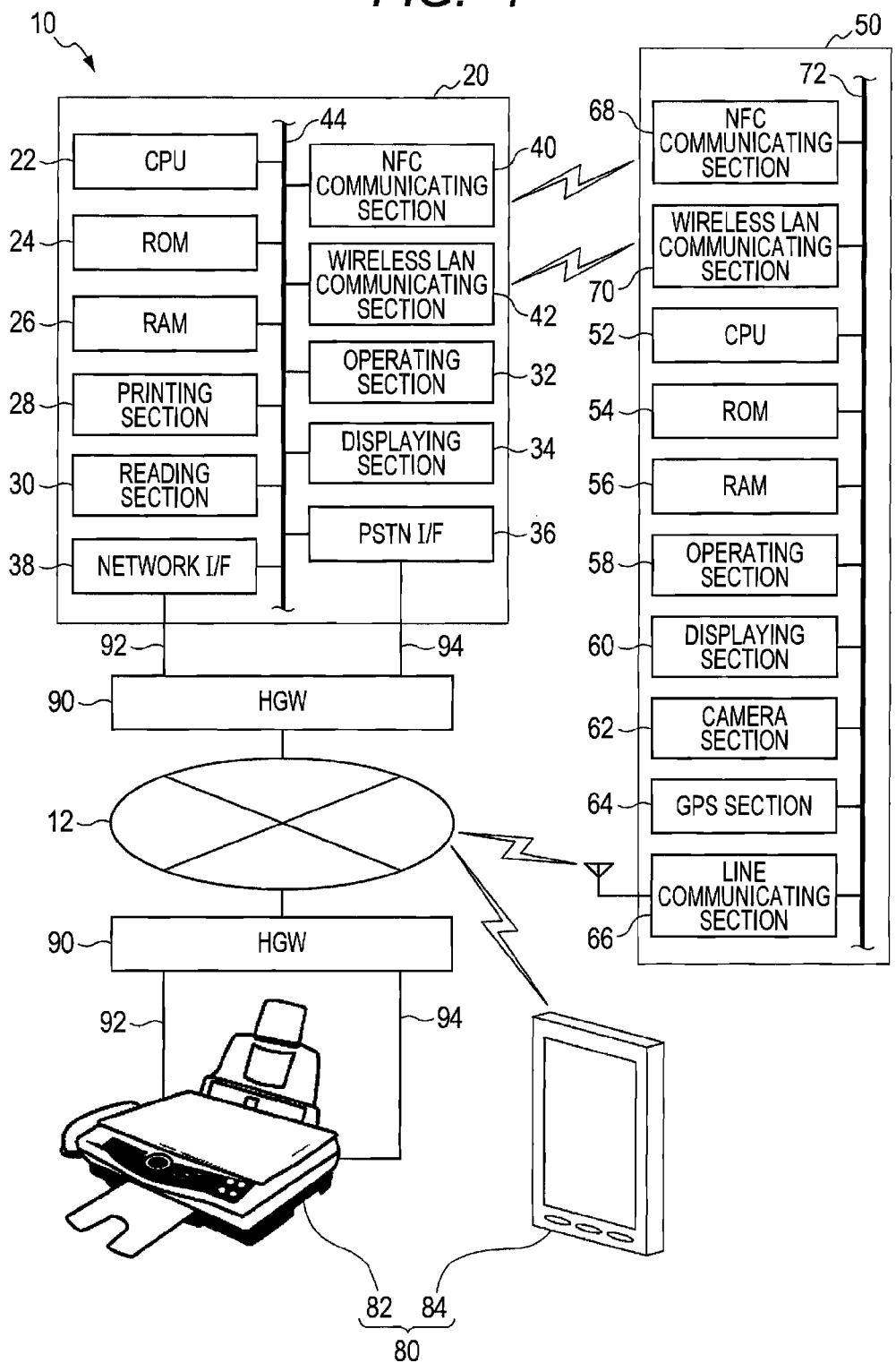
FIG. 1 is a schematic view showing a communication system according to an embodiment.

The overall configuration of a communication system 10 according to an embodiment will be described while referring to drawings. The communication system 10 includes a communication apparatus 20, a mobile terminal 50, and a counterpart apparatus 80. An example of the communication apparatus 20 is an information processing apparatus having a facsimile function and an electronic-mail (E-mail) function. The communication apparatus 20 is electrically connectable to a telephone network 12. The telephone network 12 may be an optical communication network and/or PSTN (Public Switched Telephone Networks) that is established by a certain communication carrier. Another example of the telephone network 12 may be 3G/4G mobile network for mobile phones. Here, the telephone network 12 in the present embodiment does not mean only a specific communication network, but collectively means various communication networks that are used by users who make contract with each communication carrier. The communication apparatus 20 is configured to be connected to the telephone network 12 via a home gateway (hereinafter referred to as "HGW") 90. Connection to the telephone network 12 via the HGW 90 is already-commercialized technology, and thus descriptions therefor are omitted. The communication apparatus 20 is configured to be connected to the HGW 90 through a LAN cable 92 and a telephone cord 94.

An example of the mobile terminal 50 may be a smartphone having computer functions. The mobile terminal 50 is capable of communicating with the communication apparatus 20 in compliance with first non-contact communication protocol and second non-contact communication protocol. Near Field Communication (hereinafter referred to as "NFC communication") is an example of the first non-contact communication protocol (short-range wireless communications or close proximity wireless communications). Wireless LAN, Bluetooth® (registered trademark of Bluetooth SIG), etc. are examples of the second non-contact communication protocol. The present embodiment will be described with the NFC for the first non-contact communication and the Wireless LAN for the second non-contact communication. The mobile terminal 50 can make a telephone call with the counterpart apparatus 80. The NFC communication has a capability of communicating with the mobile terminal located within a first communication range. The wireless LAN or Bluetooth has a capability of communicating with the mobile terminal located within the second communication range. The second communication range is greater than the first communication range.

The counterpart apparatus 80 is a remote apparatus that is configured to be connected to the telephone network 12 and that is a communication counterpart of the communication apparatus 20 and the mobile terminal 50. Examples of the counterpart apparatus 80 may include a facsimile apparatus 82 and a mobile terminal 84. The facsimile apparatus 82 has a facsimile function as well as a telephone function. The facsimile apparatus 82 is connectable to the telephone network 12. The facsimile apparatus 82 is configured to connect to the telephone network 12 in a similar manner to the communication apparatus 20. Note that the facsimile apparatus 82 is a known facsimile apparatus, and detail descriptions on the facsimile apparatus 82 are omitted.

Though the mobile terminal 84 is a known smartphone in the present embodiment, the mobile terminal 84 may be a known cell phone such as a flip phone. In a case where the mobile terminal 84 is a smartphone, by installing and executing a computer program (e.g., an application) for a mobile terminal process described later on the mobile terminal 84, the mobile terminal 84 can also implement a similar function as the mobile terminal 50 does. Other detail descriptions on the mobile terminal 84 are omitted.

<Communication Apparatus>

The communication apparatus 20 will be described while referring to drawings. The communication apparatus 20 includes a CPU 22, a ROM 24, a RAM 26, a printing section 28, a reading section 30, an operating section 32, a displaying section 34, a PSTN I/F 36, a network I/F 38, an NFC communicating section 40, and a wireless LAN communicating section 42. These sections 22-42 are connected to a bus line 44.

Figures 2, 3:
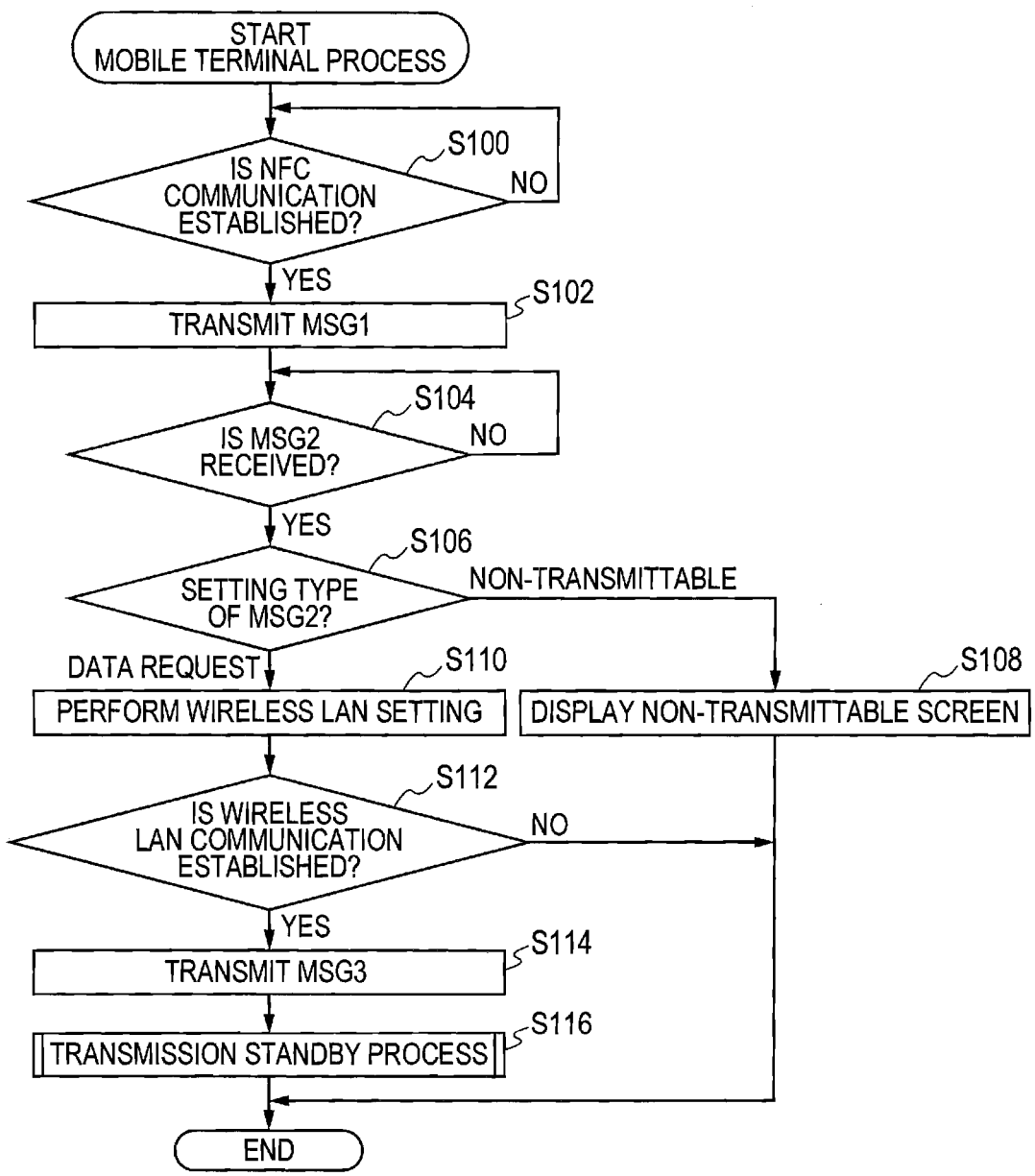
FIG. 2 is an example of a conversion table.
FIG. 3 is a flowchart showing a mobile terminal process.

The CPU 22 executes arithmetic processes. The ROM 24 stores computer programs for each process described later (see FIGS. 6, 7, and 9) and a conversion table. The ROM 24 includes an area storing the computer programs and an area storing the conversion table. The ROM 24 is a flash memory (e.g., a non-volatile memory) in the present embodiment. As shown in FIG. 2, the conversion table includes a telephone number and a FAX number, in association with each other, of the counterpart apparatus 80. The FAX number is a telephone number used only for facsimile communication. The RAM 26 serves as a storage area that is used when the CPU 22 executes various computer programs. The RAM 26 stores predetermined data (information) used in execution of various processes. The CPU 22 executes various computer programs stored in the ROM 24, to control the communication apparatus 20. In this way, the communication apparatus 20 executes various processes to implement various functions.

The printing section 28 prints on recording paper an image corresponding to facsimile data received by the communication apparatus 20. The reading section 30 reads an original document. The operating section 32 includes a plurality of keys. The keys of the operating section 32 may include ten keys such as 0-9, a start key, and else. The displaying section 34 includes a display for displaying various kinds of information. The telephone cord 94 is inserted and connected to the PSTN I/F 36. The PSTN I/F 36 includes a network control unit (NCU) and a modem. The PSTN I/F 36 is an example of an interface for transmission/reception of facsimile data via the telephone network 12. The LAN cable 92 is inserted and connected to the network I/F 38. The network I/F 38 is an example of an interface for transmission/reception of electronic mail via the telephone network 12. The PSTN I/F 36 and the network I/F 38 are collectively referred to as "public-line communicating section".

The NFC communicating section 40 is for performing short-range wireless communication in compliance with the NFC standard. The wireless LAN communicating section 42 is for performing wireless communication in compliance with the wireless LAN standard. Between the communication apparatus 20 and the mobile terminal 50, pairing of the both apparatuses and transmission/reception of a small amount of data are performed through NFC communication, whereas transmission/reception of a large amount of data is performed through high-speed communication such as wireless LAN communication and Bluetooth. Such communication technology is referred to as "handover" ("Wi-Fi® (registered trademark of Wi-Fi Alliance) handover" in the present embodiment, and "Bluetooth handover" in the case of Bluetooth). As will be described later in detail, in the present embodiment, transmission/reception of message (hereinafter referred to as "MSG) 1 and MSG2 is performed through NFC communication, whereas transmission/reception of MSG3 and MSG4 is performed through wireless LAN communication.

<Mobile Terminal>

The mobile terminal 50 will be described while referring to FIG. 1. The mobile terminal 50 includes a CPU 52, a ROM 54, a RAM 56, an operating section 58, a displaying section 60, a camera section 62, a GPS section 64, a line communicating section 66, an NFC communicating section 68, and a wireless LAN communicating section 70. These sections 52-70 are connected to a bus line 72.

The CPU 52 executes arithmetic processes. The ROM 54 is a flash memory (e.g., non-volatile memory). The ROM 54 stores various computer programs including a computer program for each process described later (see FIGS. 3 and 5). The computer programs are downloaded from a predetermined server etc. on the Internet, and are installed in the ROM 54. The ROM 54 is capable of storing various data. Examples of various data include the telephone number of the mobile terminal 50, information on the user of the mobile terminal 50

(user name), photograph data and comments (text data), an address book, and the like. The address book includes one or plurality of telephone number for each counterpart apparatus 80. FAX attribute information indicates that a telephone number in the address book is a FAX number. The FAX attribute information may be stored in the address book so as to be associated with the telephone number. Further, an electronic-mail address may be stored in the address book so as to be associated with the telephone number. So, in some cases, electronic-mail addresses are stored in the address book. The RAM 56 serves as a storage area that is used when the CPU 52 executes various computer programs. The RAM 56 stores predetermined data (information) used in execution of various processes. The CPU 52 executes various computer programs stored in the ROM 54, to control the mobile terminal 50. In this way, the mobile terminal 50 executes various processes to implement various functions.

The operating section 58 includes predetermined keys. The operating section 58 may be realized by a touch panel function. In a state where a predetermined computer program is started, the operating section 58 may be operated to input text data. The displaying section 60 is a display for displaying various kinds of information. The camera section 62 takes an image. Photograph data corresponding to the taken image may be stored in the ROM 54. The GPS section 64 acquires GPS (Global Positioning System) information. The line communicating section 66 performs communication via the telephone network 12. A telephone call between the mobile terminal 50 and the counterpart apparatus 80 is performed via the line communicating section 66. The NFC communicating section 68 and the wireless LAN communicating section 70 have similar configurations to the NFC communicating section 40 and the wireless LAN communicating section 42, respectively, in the communication apparatus 20. NFC communication between the communication apparatus 20 and the mobile terminal 50 is performed via the NFC communicating section 40 and the NFC communicating section 68. Wireless LAN communication between the communication apparatus 20 and the mobile terminal 50 is performed via the wireless LAN communicating section 42 and the wireless LAN communicating section 70. The operating section 58, the displaying section 60, the camera section 62, the GPS section 64, the line communicating section 66, the NFC communicating section 68, and the wireless LAN communicating section 70 are also provided in a known smartphone. Hence, other descriptions on each section 58-70 are omitted.

<Process Executed by Mobile Terminal>

A mobile terminal process executed by the mobile terminal 50, and a transmission standby process executed in the mobile terminal process will be described. According to the mobile terminal process, an instruction to transmit facsimile data or electronic mail can be given appropriately to the communication apparatus 20.

<Mobile Terminal Process>

The mobile terminal process will be described while referring to FIG. 3. The mobile terminal process is started when the following three conditions are met: 1. the computer program for the mobile terminal process is started; 2. a telephone call with the counterpart apparatus 80 is started; and 3. the mobile terminal 50 is held over the NFC communicating section 40 of the communication apparatus 20 and is proximate to the NFC communicating section 40. After the computer program for the mobile terminal process is started, or while the mobile terminal process is being executed, the user selects subject data that is to be transmitted to the counterpart apparatus 80 which is during a telephone call and busy (hereinafter, referred to as "busy counterpart apparatus 80") or an associated apparatus. Note that, in the present embodiment based on the communication system 10 shown in FIG. 1, if the busy counterpart apparatus 80 is the mobile terminal 84, the associated apparatus to the busy counterpart apparatus 80 is the facsimile apparatus 82. On the other hand, if the busy counterpart apparatus 80 is the facsimile apparatus 82, the associated apparatus to the busy counterpart apparatus 80 is the mobile terminal 84.

With regard to selection of subject data, the user selects all or part of various data stored in the ROM 54 and/or GPS information acquired by the GPS section 64. In one instance, the user selects photograph data stored in the ROM 54 as the subject data. If the ROM 54 stores a plurality of photograph data, all the photograph data or one or more photograph data are selected appropriately. Then, the user selects, as the subject data, the telephone number of the mobile terminal 50, information on the user of the mobile terminal 50, comments, and/or GPS information. The computer program for the mobile terminal process may be started in a state where the subject data is selected. The user of the mobile terminal 50 holds the mobile terminal 50 over the NFC communicating section 40 of the communication apparatus 20 at predetermined timing during a telephone call with the counterpart apparatus 80 via the mobile terminal 50.

The CPU 52 having started the mobile terminal process determines whether NFC communication is established (S100). When the mobile terminal 50 is held over and proximate to the NFC communicating section 40 (in other words, when the mobile terminal 50 is located within the NFC communication range of the NFC communicating section 40), pairing is performed between the NFC communicating section 40 and the NFC communicating section 68, thereby establishing NFC communication. If NFC communication is not established (S100: No), the CPU 52 repeats S100. If NFC communication is established (S100: Yes), the CPU 52 controls the NFC communicating section 68 to transmit MSG1 (S102). Then, MSG1 is transmitted from the NFC communicating section 68.

Figures 4, 5:
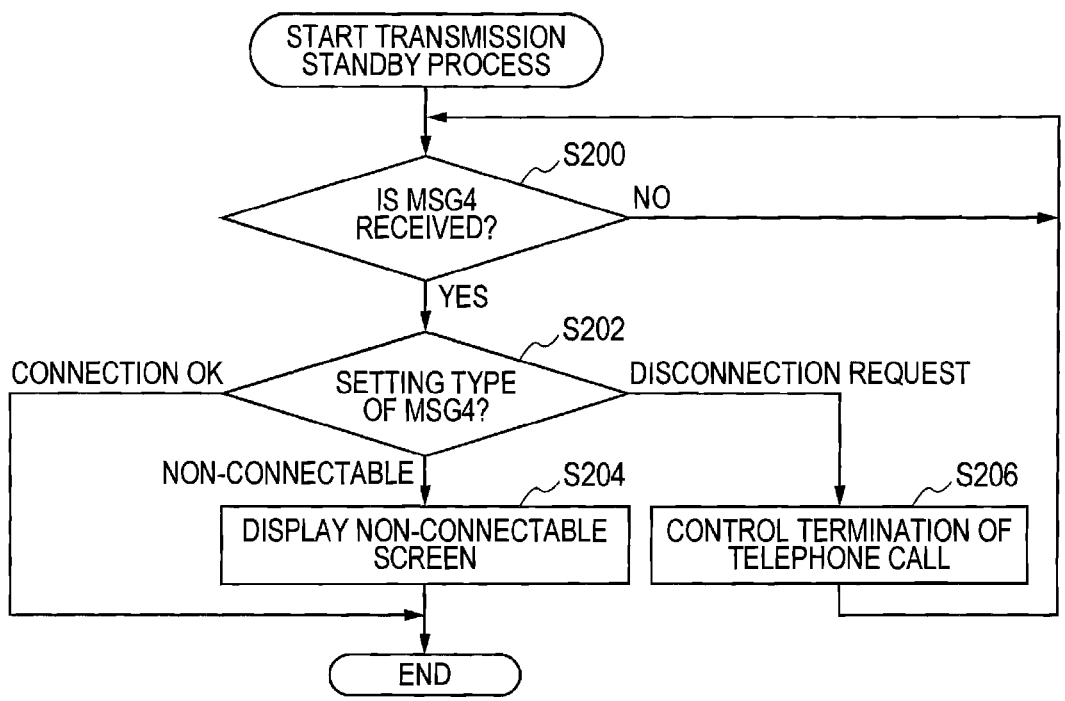
FIG. 4 is an explanatory view of a direction statement.
FIG. 5 is a flowchart showing a transmission standby process.

As shown in FIG. 4, MSG1 is a direction statement including various information such as wireless LAN settings, JOB information, and destination information. The wireless LAN settings include various setting information used for wireless LAN communication between the wireless LAN communicating section 70 and the wireless LAN communicating section 42 (see FIG. 4). The JOB information includes each piece of information indicating that the mobile terminal 50 is currently during a telephone call, and information indicating that data transmission is required to the busy counterpart apparatus 80 or the associated apparatus.

The destination information includes the telephone number of the busy counterpart apparatus 80. In the present embodiment, the telephone number of the busy counterpart apparatus 80 communicating with the mobile terminal 50 is referred to as "telephone number A". If the address book stored in the ROM 54 of the mobile terminal 50 includes another telephone number (hereinafter referred to as "telephone number B") and/or electronic-mail address (hereinafter referred to as "electronic-mail address C") in association with the telephone number A, the destination information includes the telephone number B and/or the electronic-mail address C. If the telephone number B and/or the electronic-mail address C is not stored in association with the telephone number A, the destination information is only the telephone number A.

Subsequently, the CPU 52 determines whether MSG2 is received by the NFC communicating section 68 (S104). MSG2 is transmitted from the NFC communicating section 40 in S312 of FIG. 6. In MSG2, either one of "data request" and "non-transmittable" is set. Other descriptions on MSG2 will be described later. If MSG2 is not received (S104: No), the CPU 52 repeats S104. If MSG2 is received (S104: Yes), the CPU 52 determines a type of information set in MSG2 (S106).

If "non-transmittable" is set in MSG2 (S106: non-transmittable), the CPU 52 controls the displaying section 60 to display a non-transmittable screen (S108). So, the displaying section 60 displays the non-transmittable screen. The non-transmittable screen includes information that data transmission to the counterpart apparatus 80 cannot be performed. As will be described later, "non-transmittable" is set as the address type (S416 in FIG. 7) if the telephone number A is the number of the mobile phone and MSG1 does not include the electronic-mail address C (S408: Yes, S410: No in FIG. 7). Thus, "non-transmittable" is set in MSG2 (S306: non-transmittable, S310 in FIG. 6). Accordingly, if S108 is executed, the busy counterpart apparatus 80 which is connected with the mobile terminal 50 is the mobile terminal 84. If the busy counterpart apparatus 80 is the mobile terminal 84, the non-transmittable screen may include information for prompting a use of transmittable electronic-mail service that can be sent to the telephone number A of the mobile terminal 84, thereby guiding the user to use such an electronic-mail service. At timing when a predetermined period elapses after the non-transmittable screen is displayed in S108, the CPU 52 ends the mobile terminal process.

If "data request" is set in MSG2 (S106: data request), the CPU 52 performs setting up in accordance with wireless LAN setting included in MSG1 (S110). In accordance with the wireless LAN setting, the wireless LAN communicating section 70 executes procedures for establishing wireless LAN communication with the wireless LAN communicating section 42 of the communication apparatus 20. Further, the CPU 52 determines whether wireless LAN communication is established (S112). If wireless LAN communication is not established (S112: No), the CPU 52 ends the mobile terminal process.

If wireless LAN communication is established (S112: Yes), the CPU 52 controls the wireless LAN communicating section 70 to transmit MSG3 (S114). MSG3 includes subject data of data transmission requested in MSG1. Assuming that photograph data and/or GPS information stored in the ROM 54 are selected in the mobile terminal 50 as the subject data, MSG3 including the selected photograph data and/or GPS information are transmitted from the wireless LAN communicating section 70 to the wireless LAN communicating section 42 of the communication apparatus 20. Subsequently, the CPU 52 executes a transmission standby process (S116). The transmission standby process is a counterpart process of a transmitting process executed by the communication apparatus 20 (see S322 in FIG. 6 and FIG. 9). The transmission standby process will be described later. After execution of S116, the CPU 52 ends the mobile terminal process.

<Transmission Standby Process>

The transmission standby process executed in S116 in the mobile terminal process shown in FIG. 3 will be described while referring to FIG. 5. The CPU 52 having started the transmission standby process determines whether MSG4 is received by the wireless LAN communicating section 70 (S200). MSG4 includes one of settings "connection OK", "disconnection request" and "non-connectable" (see S504, S514, S522, or S528 in FIG. 9). MSG4 including "connection OK" is transmitted from the wireless LAN communicating section 42 in S506 or S524 in FIG. 9. MSG4 including "disconnection request" is transmitted from the wireless LAN communicating section 42 in S516 in FIG. 9. MSG4 including "non-connectable" is transmitted from the wireless LAN communicating section 42 in S530 in FIG. 9. If MSG4 is not received (S200: No), the CPU 52 repeats S200.

If MSG4 is received (S200: Yes), the CPU 52 determines a type of information set in MSG4 (S202). If "connection OK" is set in MSG4 (S202: connection OK), the CPU 52 ends the transmission standby process. If "non-connectable" is set in MSG4 (S202: non-connectable), the CPU 52 controls the displaying section 60 to display a non-connectable screen (S204). So, the non-connectable screen is displayed on the displaying section 60. The non-connectable screen includes information that connection cannot be performed with the busy counterpart apparatus 80. At timing when a predetermined period elapses after the non-connectable screen is displayed in S204, the CPU 52 ends the transmission standby process.

If "disconnection request" is set in MSG4 (S202: disconnection request), the CPU 52 controls termination of a telephone call with the busy counterpart apparatus 80 (S206). To terminate the telephone call with the busy counterpart apparatus 80, the CPU 52 controls the displaying section 60 to display a disconnection request screen. So, the disconnection request screen is displayed on the displaying section 60. The disconnection request screen includes information for prompting termination of the telephone call with the busy counterpart apparatus 80. Alternatively, the CPU 52 may control to automatically disconnect the telephone call with the counterpart apparatus 80. In this case, prior to disconnection, the CPU 52 may control to output a voice message that the telephone call will be automatically disconnected. The user of the mobile terminal 50 listens to the voice message outputted by the mobile terminal 50. It may be appropriately determined what kind of process is required to terminate a telephone call with the counterpart apparatus 80. Subsequently, the CPU 52 returns to S200 so as to repeat the above-described processes.

<Process Executed by Communication Apparatus>

A communication apparatus process executed by the communication apparatus 20, and an address determining process and a transmitting process both executed in the communication apparatus process will be described. According to the communication apparatus process, facsimile data or electronic mail can be transmitted to the busy counterpart apparatus 80, which is during a telephone call with the mobile terminal 50, or to the associated apparatus.

<Communication Apparatus Process>

The communication apparatus process will be described while referring to FIG. 6. The communication apparatus process is started when the power of the communication apparatus 20 is turned on. The CPU 22 having started the communication apparatus process determines whether NFC communication is established (S300). Establishment of NFC communication has already been described in connection to S100 in the mobile terminal process (see FIG. 3), and hence the descriptions therefor are omitted. If NFC communication is not established (S300: No), the CPU 22 repeats S300. If NFC communication is established (S300: Yes), the CPU 22 determines whether MSG1 is received by the NFC communicating section 40 (S302). MSG1 is transmitted from the NFC communicating section 68 in S102 of FIG. 3.

If MSG1 is not received (S302: No), the CPU 22 repeats S302. If MSG1 is received (S302: Yes), the CPU 22 executes the address determining process (S304). In the address determining process, an address type and an address are determined. The address determining process will be described later. Subsequently, the CPU 22 determines whether the address type stored in the RAM 26 in S304 is "FAX or Mail" (FAX/MAIL) or "non-transmittable" (S306). If the address type is "FAX or Mail" (S306: FAX/MAIL), the CPU 22 generates MSG2 in which "data request" is set (S308). If the address type is "non-transmittable" (S306: non-transmittable), the CPU 22 generates MSG2 in which "non-transmittable" is set (S310). After S308 or S310 is executed, the CPU 22 controls the NFC communicating section 40 to transmit MSG2 (S312). So, MSG2 is transmitted from the NFC communicating section 40.

Next, the CPU 22 determines a setting type of MSG2 (S314). If S310 is executed, "non-transmittable" is set in MSG2. If "non-transmittable" is set in MSG2 (S314: non-transmittable), the CPU 22 ends the communication apparatus process. If S308 is executed, "data request" is set in MSG2. If "data request" is set in MSG2 (S314: data request), the CPU 22 performs setting in accordance with wireless LAN setting included in MSG1 (S316). In accordance with the wireless LAN setting, the wireless LAN communicating section 42 executes procedures for establishing wireless LAN communication with the wireless LAN communicating section 70 of the mobile terminal 50.

Subsequently, the CPU 22 determines whether wireless LAN communication is established (S318). If wireless LAN communication is not established (S318: No), the CPU 22 ends the communication apparatus process. If wireless LAN communication is established (S318: Yes), the CPU 22 determines whether MSG3 is received by the wireless LAN communicating section 42 (S320). MSG3 is transmitted from the wireless LAN communicating section 70 in S114 of FIG. 3. The transmission/reception of MSG3 performed between the wireless LAN communicating section 70 and the wireless LAN communicating section 42 is realized by communication technology that is referred to as the above-described handover (Wi-Fi handover).

If MSG3 is not received (S320: No), the CPU 22 repeats S320. If MSG3 is received (S320: Yes), the CPU 22 executes the transmitting process (S322). With the transmitting process, either electronic mail including transmission data corresponding to the subject data or facsimile data obtained by encoding the transmission data is transmitted to the counterpart apparatus 80. After S322 is executed, the CPU 22 ends the communication apparatus process. Note that the CPU 22 restarts the communication apparatus process at predetermined timing (for example, immediately) after the communication apparatus process ends.

<Address Determining Process>

The address determining process executed in S304 in the communication apparatus process shown in FIG. 6 will be described while referring to FIG. 7. The CPU 22 having started the address determining process determines whether the telephone number A included in MSG1 is stored in the conversion table (see FIG. 2) (S400). If the telephone number A is stored in the conversion table (S400: Yes), the CPU 22 acquires the FAX number stored in association with the telephone number A in the conversion table (S402). For example, assuming that the telephone number A is "052-777-8888" and the conversion table is in a state shown in FIG. 2, the CPU 22 acquires FAX number "052-777-8889" stored in association with telephone number "052-777-8888" (see "No. 1" in FIG. 2). In the present embodiment, the FAX number acquired in S402 is referred to as "FAX number A'". Subsequently, the CPU 22 sets "FAX" as the address type (S404), and sets FAX number A' as the address (S406). "FAX" as the address type and FAX number A' as the address ("052-777-8889" in the above example) are stored in the RAM 26 (see "Example 1" in FIG. 8).

If the telephone number A is not stored in the conversion table (S400: No), the CPU 22 determines whether the telephone number A is a telephone number that is allocated to a mobile phone (S408). For example, in Japan, telephone numbers allocated to mobile phones (including PHS: Personal Handy-phone System) begin with numbers "090", "080", or "070". Accordingly, the CPU 22 determines NO in S408 (S408: No) if the telephone number A does not begin with any of the above numbers. The CPU 22 determines YES in S408 (S408: Yes) if the telephone number A begins with one of the above numbers. Note that the mobile terminal 84 cannot receive facsimile data. Accordingly, S408 is also a process for determining whether facsimile data is transmittable to the counterpart apparatus 80. Determining YES in S408 (S408: Yes) corresponds to a determination result that facsimile data is non-transmittable. Determining NO in S408 (S408: No) corresponds to a determination result that facsimile data is transmittable.

If YES in S408 (S408: Yes), the CPU 22 determines whether MSG1 includes the electronic-mail address C (S410). If MSG1 includes the electronic-mail address C (S410: Yes), the CPU 22 sets Mail as the address type (S412), and sets the electronic-mail address C as the address (S414). Mail as the address type and the electronic-mail address C as the address are stored in the RAM 26. Assuming that the telephone number A is "080-222-0000" (not stored in the conversion table of FIG. 2), and that the electronic-mail address C included in MSG1 is "aaa@bbbb.com", Mail as the address type and "aaa@bbbb.com" as the address are stored in the RAM 26 (see "Example 2" in FIG. 8). If MSG1 does not include the electronic-mail address C (S410: No), the CPU 22 sets "non-transmittable" as the address type (S416). The "non-transmittable" as the address type is stored in the RAM 26 (see "Example 3" in FIG. 8). If "non-transmittable" is set, no address is set.

If NO in S408 (S408: No), the CPU 22 determines whether MSG1 includes the telephone number B (S418). If MSG1 includes the telephone number B (S418: Yes), the CPU 22 determines whether the telephone number B is allocated to a mobile phone (S420). Because S420 is executed in the same manner as S408, specific determination processes in S420 are omitted. If the telephone number B is not allocated to a mobile phone (S420: No), the CPU 22 sets FAX as the address type (S422), and sets the telephone number B as the address (S424). FAX as the address type and the telephone number B as the address are stored in the RAM 26. Assuming that the telephone number A is "054-333-4444" (not stored in the conversion table of FIG. 2), and the telephone number B included in MSG1 is "054-333-4445", FAX as the address type and "054-333-4445" as the address are stored in the RAM 26 (see "Example 4" in FIG. 8).

The telephone number A is assigned to the busy counterpart apparatus 80, which is during a telephone call with the mobile terminal 50. It can be presumed that the telephone number B stored in the address book of the ROM 54 of the mobile terminal 50 in association with the telephone number A is a FAX number. S422 and S424 are processes based on this presumption. Note that a FAX number is used for facsimile communication and has the same configuration as a telephone number, as described above. Telephone numbers and FAX numbers are defined in compliance with the 0ABJ or E.164 standard, and are allocated by a communication carrier. Accordingly, it is merely a formality matter whether a number allocated by the communication carrier should be referred to as "telephone number" or "FAX number". So, "telephone number" typically includes so-called "FAX number".

If MSG1 does not include the telephone number B (S418: No), or if the telephone number B is allocated to a mobile phone (S420: Yes), the CPU 22 sets FAX as the address type (S426) and sets the telephone number A as the address (S428). Although the telephone number A is inputted for the telephone call at the mobile terminal 50, a user may have a single telephone number commonly used for the FAX number as well. S426 and S428 are processes based on a presumption that the busy counterpart apparatus 80 is the facsimile apparatus 82, and that the telephone number A is also used as a FAX number. FAX as the address type and the telephone number A as the address are stored in the RAM 26.

Assuming that the telephone number A is "055-333-5555" (not stored in the conversion table of FIG. 2), and that MSG1 does not include the telephone number B (S418: No), FAX as the address type and "055-333-5555" as the address are stored in the RAM 26 (see "Example 5" in FIG. 8). Or, assuming that the telephone number A is "055-333-3333" (not stored in the conversion table of FIG. 2), and that the telephone number B included in MSG1 is "090-222-3333" (S420: Yes), FAX as the address type and "055-333-3333" as the address are stored in the RAM 26 (see "Example 6" in FIG. 8).

Figure 6:
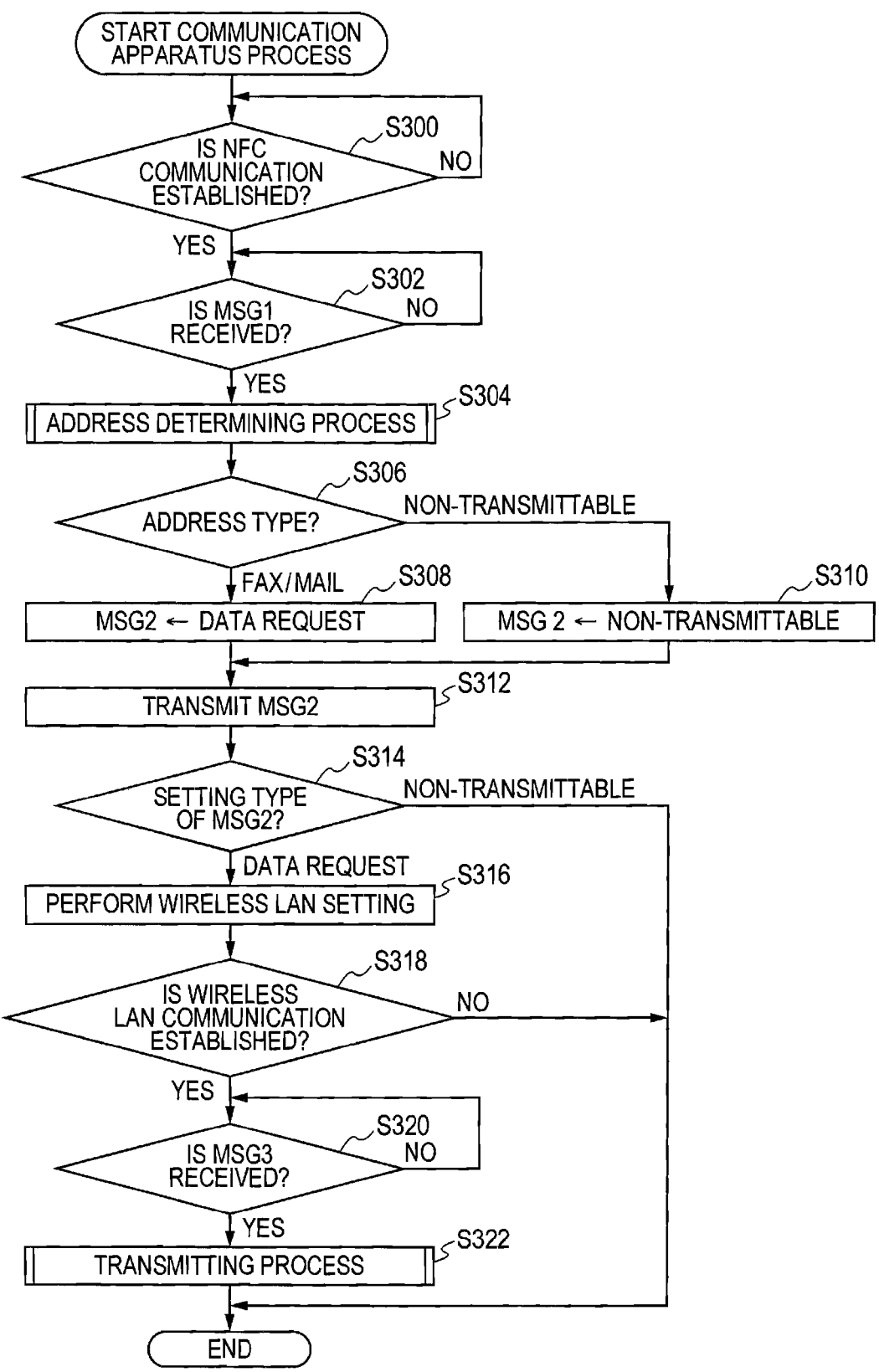
FIG. 6 is a flowchart showing a communication apparatus process.
Figure 7:
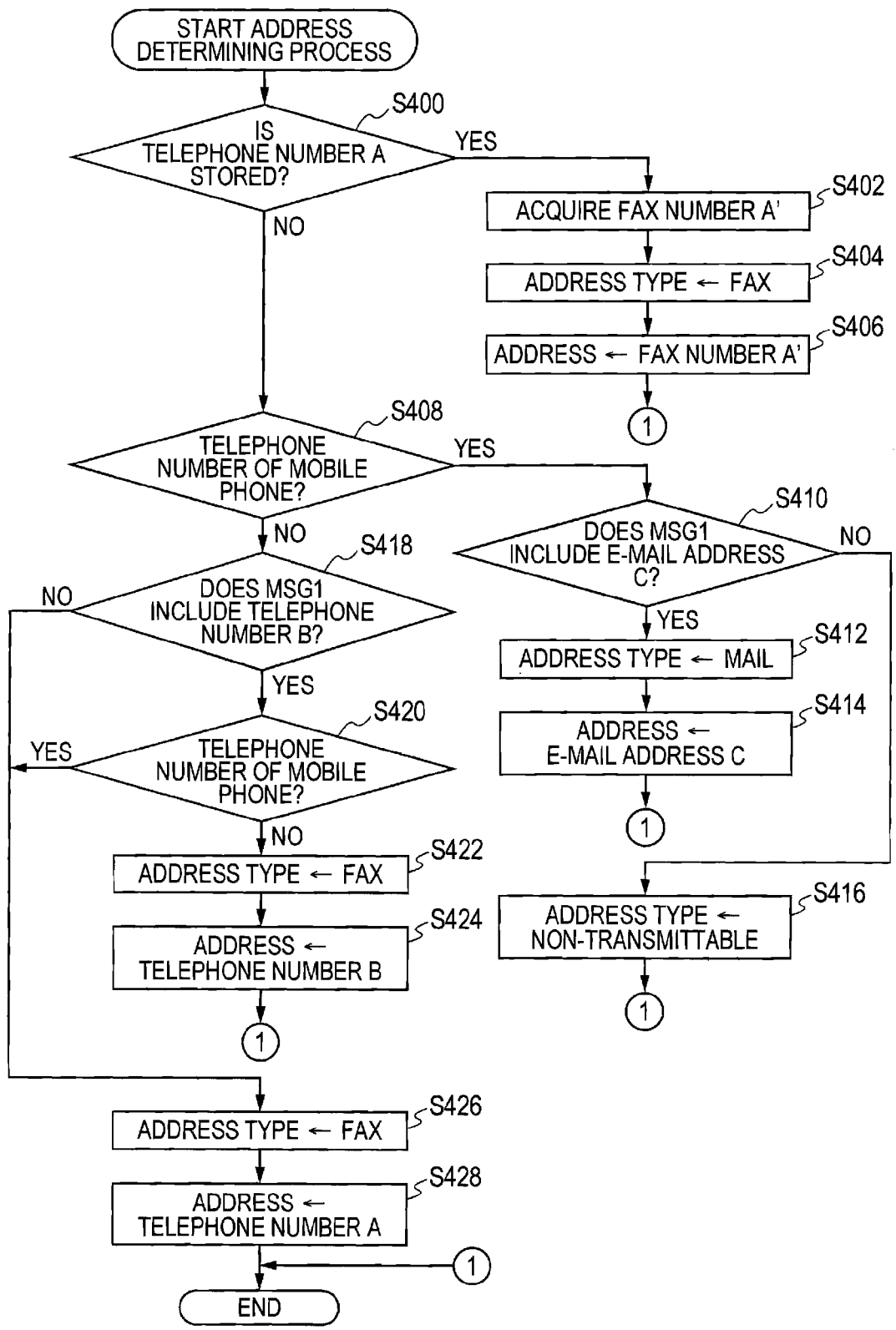
FIG. 7 is a flowchart showing an address determining process.

After S406, S414, S416, S424 or S428 is executed, the CPU 22 ends the address determining process, and returns the process to S306 in FIG. 6.

<Transmitting Process>

The transmitting process executed in S322 of the communication apparatus process shown in FIG. 6 will be described while referring to FIG. 9. The CPU 22 having started the transmitting process generates transmission data (S500). The transmission data is generated from subject data included in MSG3. Subsequently, the CPU 22 determines the address type stored in the RAM 26. The address type is stored in the RAM 26 in S404, S412, S422, or S426 in FIG. 7. If the address type is Mail (S502: Mail), the CPU 22 generates MSG4 in which "connection OK" is set (S504). In this case, "connection OK" means that connection is established between the communication apparatus 20 and an e-mail server for electronic mail communication and that electronic mail including transmission data can be transmitted. The CPU 22 controls the wireless LAN communicating section 42 to transmit MSG4 generated in S504 (S506). So, MSG4 is transmitted from the wireless LAN communicating section 42. Subsequently, the CPU 22 controls the network I/F 38 to transmit electronic mail including transmission data to the electronic-mail address stored in the RAM 26 in S414 of FIG. 7 (S508). So, the electronic mail including the transmission data is transmitted from the network I/F 38.

If the address type is FAX (S502: FAX), the CPU 22 dials the address stored in the RAM 26. The address is stored in the RAM 26 in S406, S424, or S428 of FIG. 7. Subsequently, the CPU 22 determines whether the counterpart apparatus 80 of the address is during a telephone call (S512). If a busy tone is detected, the determination result is YES (S512: Yes) assuming that the counterpart apparatus 80 is during a telephone call. Such a determination is made when the telephone call is continuing between the mobile terminal 50 and the counterpart apparatus 80. If a ringback tone is detected, the determination result is NO (S512: No). Also, if the telephone cord 94 is not inserted to the PSTN I/F 36 and no signal is detected, the determination result is NO (S512: No).

If the determination result is YES in S512 (S512: Yes), the CPU 22 generates MSG4 in which "disconnection request" is set (S514). The CPU 22 controls the wireless LAN communicating section 42 to transmit MSG4 generated in S514 (S516). So, MSG4 is transmitted from the wireless LAN communicating section 42. After S516 is executed, the CPU 22 stands by for a predetermined period (S518). The standby period is appropriately set by considering a time period etc. stipulated in a rule relating to redialing to the same telephone number/FAX number (e.g., in compliance with Japanese rule for terminal facilities etc., Article 11 Section 1 (3)) and a time period etc. required for telephone call termination in response to "disconnection request". After a standby for the predetermined period, the CPU 22 returns the process to S510 and repeats the processes in S510 and thereafter.

If the determination result is NO in S512 (S512: No), the CPU 22 determines whether the communication apparatus 20 has succeeded in establishing connection with the counterpart apparatus 80 at the address of the FAX number A' (see S406 in FIG. 7), the telephone number B (see S424 in FIG. 7), or the telephone number A (see S428 in FIG. 7) (S520). S520 is executed based on whether a ringback tone detected after dialing has become undetected within a predetermined period. Specifically, if the ringback tone has become undetected within the predetermined period, the determination result is YES in S520 (S520: Yes) assuming that the connection is established. If the ringback tone is still detected after an elapse of the predetermined period, the determination result is NO in S520 (S520: No) assuming that the connection is not established. Also, if no ringback tone is detected at all after dialing, the determination result is NO in S520 (S520: No) assuming that the connection is not established.

If YES in S520 (S520: Yes), the CPU 22 generates MSG4 in which "connection OK" is set (S522). The "connection OK" in this case means that transmission data can be transmitted to the counterpart apparatus 80 in compliance with facsimile transmission protocol. The CPU 22 controls the wireless LAN communicating section 42 to transmit MSG4 generated in S522 (S524). Subsequently, the CPU 22 controls the PSTN I/F 36 to transmit facsimile data obtained by encoding the transmission data to the FAX number A', the telephone number B, or the telephone number A stored in RAM26 (S526). So, the facsimile data is transmitted from the PSTN I/F 36. The FAX number A' is stored in the RAM 26 in S406 of FIG. 7. The telephone number B is stored in the RAM 26 in S424 of FIG. 7. The telephone number A is stored in the RAM 26 in S428 of FIG. 7.

If NO in S520 (S520: No), the CPU 22 generates MSG4 in which "non-connectable" is set (S528). The CPU 22 controls the wireless LAN communicating section 42 to transmit MSG4 generated in S528 (S530). So, MSG4 is transmitted from the wireless LAN communicating section 42. After S508, S526, or S530 is executed, the CPU 22 ends the transmitting process.

Advantageous Effects of the Present Embodiment

According to the present embodiment, the following advantageous effects can be obtained.

(1) In the communication system 10, MSG1 including various information shown in FIG. 4 is transmitted/received between the communication apparatus 20 and the mobile terminal 50, using NFC communication via the NFC communicating section 40 and the NFC communicating section 68 (see S102 in FIG. 3, S302: Yes in FIG. 6). In the communication apparatus 20, the address type and the address are set appropriately based on information included in MSG1 (see FIG. 7), and MSG2 depending on the address type is transmitted to the mobile terminal 50 through NFC communication (see S308-S312 in FIG. 6). And, if "data request" is set in MSG2 (see S314: data request in FIG. 6), MSG3 is transmitted/received between the communication apparatus 20 and the mobile terminal 50, using wireless LAN communication via the wireless LAN communicating section 42 and the wireless LAN communicating section 70 (see S114 in FIG. 3, S320: Yes in FIG. 6). Note that, if "non-transmittable" is set in MSG2 (see S314: non-transmittable in FIG. 6), the communication apparatus 20 does not execute the transmitting process (see S322 in FIG. 6, specifically FIG. 9).

Figure 9:
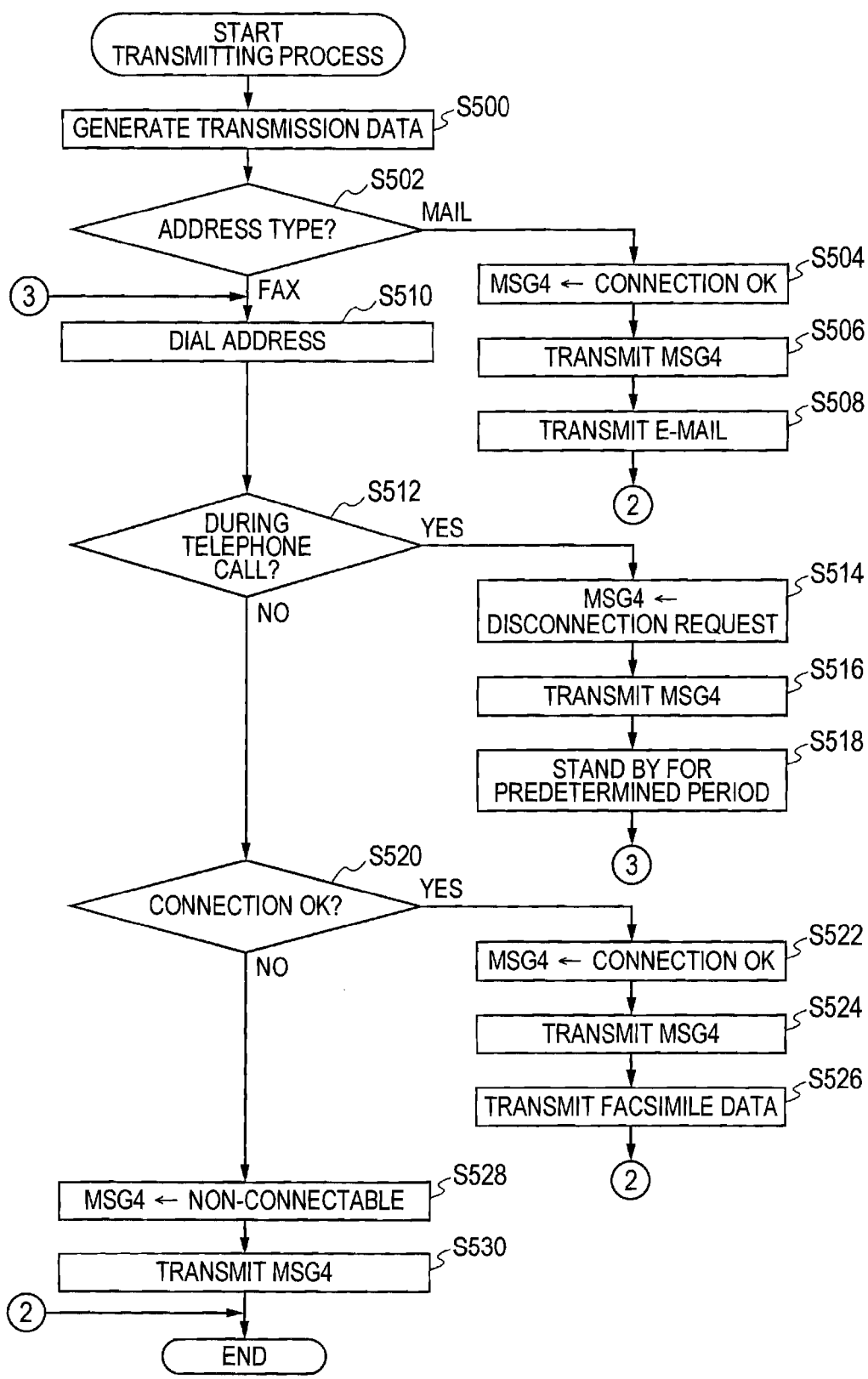
FIG. 9 is a flowchart showing a transmitting process.

Hence, electronic mail including transmission data generated from subject data included in MSG3 can be transmitted to the set electronic-mail address C as the address (see S508 in FIG. 9). The facsimile data obtained by encoding transmission data can be transmitted to the set FAX number A', the telephone number B, or the telephone number A as the address (see S526 in FIG. 9). According to the address determining process (see FIG. 7), one of the FAX number A', the telephone number B, and the telephone number A can be set appropriately, based on a registration state in the conversion table (see FIG. 2) (see S400) and based on whether the telephone number A and/or the telephone number B is the number of a mobile phone (see S408 or S420).

Electronic mail including transmission data generated from subject data from the mobile terminal 50, or facsimile data obtained by encoding the transmission data can be transmitted smoothly to the counterpart apparatus 80. The user of the mobile terminal 50 does not need to additionally perform an operation for transmitting electronic mail including transmission data or facsimile data, after the telephone call is terminated.

(2) In the communication apparatus 20, if the counterpart apparatus 80 is during a telephone call (see S512: Yes in FIG. 9) at the time of transmitting facsimile data (see S510 in FIG. 9), MSG4 in which "disconnection request" is set is transmitted to the mobile terminal 50 through wireless LAN communication (S514, S516 in FIG. 9), and redialing is performed (see S510 in FIG. 9) after a standby for a predetermined period (see S518 in FIG. 9). In the mobile terminal 50, if "disconnection request" is set in the received MSG4 (see S202: disconnection request in FIG. 5), a telephone call is terminated (see S206 in FIG. 5). Hence, transmission of facsimile data can be attempted repeatedly. Thus, when the telephone call on the mobile terminal 50 is terminated, the facsimile data can be transmitted by taking an opportunity due to the repeated attempt of facsimile transmission.

(3) In the communication apparatus 20, MSG2 in which "non-transmittable" is set is transmitted from the NFC communicating section 40 through NFC communication (see S310, S312 in FIG. 6). And, when the MSG2 is received by the NFC communicating section 68 (in S104: Yes, S106: non-transmittable in FIG. 3), the displaying section 60 of the mobile terminal 50 displays the non-transmittable screen (S108 in FIG. 3). Hence, the user of the mobile terminal 50 can be notified that data transmission to the counterpart apparatus 80 cannot be performed. In this case, S114 is skipped and transmission of MSG3 is not performed. Thus, unnecessary processes are omitted to improve processing efficiency.

(4) According to the present embodiment, even when facsimile data cannot be transmitted, if the acquired destination information includes an electronic-mail address, electronic mail corresponding to subject data can be transmitted to the electronic-mail address. This increases variation of transmission methods, and it is possible to select a transmission method through which transmission can be performed.

<Modifications>

While the invention has been described in detail with reference to the above aspects thereof, it would be apparent to those skilled in the art that various changes and modifications may be made therein without departing from the scope of the claims. For example, part of the above-described configurations may be omitted, or may be substituted with other configurations. Further, the above-described apparatuses may include other configurations.

(1) In the above-described embodiment, transmission/reception of MSG4 between the communication apparatus 20 and the mobile terminal 50 (see S200: Yes in FIG. 5, and S506, S516, S524, S530 in FIG. 9) is performed through wireless LAN communication via the wireless LAN communicating section 42 and the wireless LAN communicating section 70. However, if it is determined at the communication apparatus 20 side that the NFC communicating section 40 can perform NFC communication with the NFC communicating section 68, transmission/reception of MSG4 may be performed through NFC communication via the NFC communicating section 40 and the NFC communicating section 68.

(2) In the above-described embodiment, in S420 in the address determining process (see FIG. 7), it is determined whether the telephone number B is a telephone number that is allocated to a mobile phone. However, it may be additionally determined in S420 whether the telephone number B is associated with FAX attribute information. Or, it may be determined in S420 whether the telephone number B is associated with FAX attribute information, instead of determination whether the telephone number B is a telephone number that is allocated to a mobile phone. The FAX attribute information of the telephone number B is included in MSG1, in a state where the FAX attribute information is associated with the telephone number B.

In the case where it is additionally determined in S420 whether the telephone number B is associated with FAX attribute information, if the telephone number B is not a telephone number that is allocated to a mobile phone and if the telephone number B is associated with FAX attribute information, the CPU 22 advances the process to S422 and executes S422 and S424 as described above. If the telephone number B is a telephone number that is allocated to a mobile phone, or if the telephone number B is not associated with FAX attribute information, the CPU 22 advances the process to S426 and executes S426 and S428 as described above.

In the case where it is determined in S420 whether the telephone number B is associated with FAX attribute information, if the telephone number B is associated with FAX attribute information, the CPU 22 advances the process to S422 and executes S422 and S424 as described above. If the telephone number B is not associated with FAX attribute information, the CPU 22 advances the process to S426 and executes S426 and S428 as described above.

What is claimed is:

1. A communication apparatus comprising:
   a first communicating section configured to communicate with a mobile terminal in compliance with first non-contact communication protocol when the mobile terminal is located within a first communication range, the mobile terminal having a telephone function via a telephone network;
   a second communicating section configured to communicate with the mobile terminal in compliance with second non-contact communication protocol when the mobile terminal is located within a second communication range, the second communication range being greater than the first communication range;
   a public-line communicating section configured to transmit data via the telephone network;
   a processor; and a memory storing instructions, when executed by the processor, the instructions causing the processor to perform:
acquiring destination information from the mobile terminal via the first communicating section, the destination information being associated with a counterpart apparatus connected to the telephone network;
acquiring subject data from the mobile terminal via the second communicating section, the subject data being a subject of transmission to the destination information; and
controlling the public-line communicating section to transmit transmission data corresponding to the subject data to the counterpart apparatus at the destination information.

2. The communication apparatus according to claim 1, wherein the memory further stores instructions causing the processor to perform:
determining whether the transmission data is transmittable to the counterpart apparatus in accordance with the destination information;
controlling the public-line communicating section to transmit the transmission data to the counterpart apparatus at the destination information upon determination that the transmission data is transmittable; and
controlling the public-line communicating section not to transmit the transmission data upon determination that the transmission data is non-transmittable.

3. The communication apparatus according to claim 2, wherein the memory further stores instructions causing the processor to perform:
controlling the first communicating section to transmit first result information to the mobile terminal upon determination that the transmission data is transmittable, the first result information indicating that the transmission data is transmittable;
controlling the first communicating section to transmit second result information to the mobile terminal upon determination that the transmission data is non-transmittable, the second result information indicating that the transmission data is non-transmittable; and
acquiring the subject data via the second communicating section, the subject data being transmitted from the mobile terminal in response to transmission of the first result information to the mobile terminal.

4. The communication apparatus according to claim 2, wherein the memory further stores instructions causing the processor to perform:
determining whether the destination information includes an electronic-mail address, upon determination that the transmission data is non-transmittable in compliance with facsimile communication protocol;
controlling the public-line communicating section to transmit electronic mail to the counterpart apparatus at the electronic-mail address upon determination that the destination information includes the electronic-mail address; and
controlling the public-line communicating section not to transmit the electronic mail upon determination that the destination information includes no electronic-mail address.

5. The communication apparatus according to claim 2, wherein the memory further stores instructions causing the processor to perform:
controlling one of the first communicating section and the second communicating section to transmit, to the mobile terminal, disconnection request for disconnecting the current telephone call, in a case where it is determined that the transmission data is transmittable in compliance with facsimile communication protocol, where the public-line communicating section is controlled to transmit the transmission data, and where the counterpart apparatus is busy; and
controlling the public-line communicating section to again transmit the transmission data to a telephone number that is identified by the destination information at timing when a predetermined period elapses after the disconnection request is transmitted.

6. The communication apparatus according to claim 1, wherein the memory further stores a conversion table storing a telephone number and a facsimile number of the counterpart apparatus in association with each other;
wherein the memory further stores instructions causing the processor to perform determining an address type and an address for transmitting the transmission data, based on determinations of:
whether a telephone number in the destination information is stored in the conversion table,
whether the telephone number in the destination information is a telephone number that is allocated to a mobile phone,
whether the destination information includes another telephone number, and
whether the destination information includes an electronic-mail address;
wherein the address type is one of Fax, Mail, and Non-transmittable, the Fax indicating that the transmission data is transmitted through facsimile communication, the Mail indicating that the transmission data is transmitted through electronic mail, the Non-transmittable indicating that the transmission data is non-transmittable; and
wherein the address is a particular information of the counterpart apparatus to which the transmission data is transmitted.

7. The communication apparatus according to claim 1, wherein the memory further stores a conversion table storing a telephone number and a facsimile number of the counterpart apparatus in association with each other; and
wherein the memory further stores instructions causing the processor to perform:
determining whether a telephone number in the destination information is stored in the conversion table;
upon determination that the telephone number is stored in the conversion table, acquiring the facsimile number stored in association with the telephone number in the conversion table; and
controlling the public-line communicating section to transmit the transmission data to the counterpart apparatus at the facsimile number.

8. The communication apparatus according to claim 7, wherein the memory further stores instructions causing the processor to perform:
determining whether a telephone number in the destination information is allocated to a mobile phone;
upon determination that the telephone number is allocated to a mobile phone, determining whether the destination information includes an electronic-mail address; and
upon determination that the destination information includes an electronic-mail address, controlling the public-line communicating section to transmit electronic mail to the electronic-mail address.

9. The communication apparatus according to claim 7, wherein the memory further stores instructions causing the processor to perform:
 determining whether the destination information includes another telephone number; and
 upon determination that the destination information does not include another telephone number, controlling the public-line communicating section to transmit the transmission data to the counterpart apparatus at the telephone number in the destination information.

10. The communication apparatus according to claim 9, wherein the memory further stores instructions causing the processor to perform:
 upon determination that the destination information includes another telephone number, determining whether the another telephone number is allocated to a mobile phone;
 upon determination that the another telephone number is allocated to a mobile phone, controlling the public-line communicating section to transmit the transmission data to the counterpart apparatus at the telephone number; and
 upon determination that the another telephone number is not allocated to a mobile phone, controlling the public-line communicating section to transmit the transmission data to the counterpart apparatus at the another telephone number.

11. The communication apparatus according to claim 1, wherein the public-line communicating section comprises:
 a third communicating section configured to transmit the transmission data in compliance with facsimile communication protocol; and
 a fourth communicating section configured to transmit the transmission data in compliance with electronic mail communication protocol.

12. The communication apparatus according to claim 1, wherein the first communicating section is configured to communicate with the mobile terminal in compliance with Near Field Communication standard; and
 wherein the processor is configured to perform acquiring the destination information from the mobile terminal via the first communicating section, when the mobile terminal is located within the first communication range of the first communicating section and when a communication under the Near Field Communication standard is established.

13. A storage medium storing a set of instructions executable by a processor of a mobile terminal having a telephone function through a telephone network, the mobile terminal including: a fifth communicating section configured to communicate with a communication apparatus in compliance with first non-contact communication protocol when the mobile terminal is located within a first communication range, the communication apparatus having a facsimile function through the telephone network; and a sixth communicating section configured to communicate with the communication apparatus in compliance with second non-contact communication protocol when the mobile terminal is located within a second communication range, the second communication range being greater than the first communication range, the set of instructions, when executed by the processor of the mobile terminal, causing the processor to perform:
 controlling the fifth communicating section to transmit, to the communication apparatus, destination information associated with a counterpart apparatus connected to the telephone network; and
 controlling the sixth communicating section to transmit subject data to the communication apparatus, the subject data being used for generating transmission data transmitted from the communication apparatus to the counterpart apparatus at the destination information.

14. The storage medium according to claim 13, wherein the set of instructions further causes the processor to perform:
 controlling a display of the mobile terminal to display a non-transmittable screen associated with second result information, in a case where the fifth communicating section receives the second result information from the communication apparatus when the communication apparatus determines that transmission data is non-transmittable in accordance with the destination information; and
 controlling the sixth communicating section to transmit the subject data, in a case where the fifth communicating section receives first result information from the communication apparatus when the communication apparatus determines that transmission data is transmittable to the counterpart apparatus in accordance with the destination information.

* * * * *